US012612419B2

(12) United States Patent
Etou et al.

(10) Patent No.: US 12,612,419 B2
(45) Date of Patent: Apr. 28, 2026

(54) METHOD FOR PRODUCING FLUORINE-CONTAINING (CYCLO)ALKENYL ZINC HALIDE COMPOUND

(71) Applicants: DAIKIN INDUSTRIES, LTD., Osaka (JP); OSAKA UNIVERSITY, Osaka (JP)

(72) Inventors: Yuusuke Etou, Osaka (JP); Kenji Adachi, Osaka (JP); Sensuke Ogoshi, Osaka (JP)

(73) Assignees: DAIKIN INDUSTRIES, LTD., Osaka (JP); OSAKA UNIVERSITY, Osaka (JP)

( * ) Notice: Subject to any disclaimer, the term of this patent is extended or adjusted under 35 U.S.C. 154(b) by 222 days.

(21) Appl. No.: 17/847,654

(22) Filed: Jun. 23, 2022

(65) Prior Publication Data

US 2022/0324883 A1 Oct. 13, 2022

Related U.S. Application Data

(63) Continuation of application No. PCT/JP2020/047128, filed on Dec. 17, 2020.

(30) Foreign Application Priority Data

Dec. 27, 2019 (JP) ................................ 2019-239555

(51) Int. Cl.
*C07F 3/06* (2006.01)

(52) U.S. Cl.
CPC .................................... *C07F 3/06* (2013.01)

(58) Field of Classification Search
CPC ........................................................ C07F 3/06
See application file for complete search history.

(56) References Cited

U.S. PATENT DOCUMENTS 3,560,531 A * 2/1971 Normant ................ C07C 51/15 562/491
3,751,492 A * 8/1973 Delavarenne ............ C07F 1/00 260/665 R
6,653,515 B2 * 11/2003 Stone .................. C07D 333/12 570/138
2003/0144439 A1 * 7/2003 Stone .................... C07C 201/12 546/242
2024/0408533 A1 * 12/2024 Kagawa .................... C07F 1/08

FOREIGN PATENT DOCUMENTS

JP 8-505440 6/1996
JP 2016-128415 7/2016
JP 2016128415 A * 7/2016 .......... C07C 17/093
JP 2019-48791 3/2019
WO 94/19100 9/1994
WO 2013/172337 11/2013
WO WO-2013172337 A1 * 11/2013 .......... C07C 67/343

OTHER PUBLICATIONS

J. Gillet et al., Synthesis, 538-543 (1986) (Year: 1986).*
W. Oppolzer et al., 32 Tetrahedron Letters, 5777-5780 (1991) (Year: 1991).*
M. Lusch et al., Organic Syntheses, Coll. Vol. 7, p. 346 (1990) (Year: 1990).*
Material Safety Data Sheet (MSDS #415.00), Lithium (2009) (Year: 2009).*
A. Carty et al., 49 Canadian Journal of Chemistry, 2706-2711 (1971) (Year: 1971).*
D. Matteson et al., 102 Journal of the American Chemical Society, 7588-7590 (1980) (Year: 1980).*
K. Kikushima et al., 22 Organic Letters, 8167-8172 (Sep. 2020) (Year: 2020).*
P. De et al., 53 Synthesis, 3180-3192 (2021) (Year: 2021).*
S. Asako et al., 4 Communications Chemistry, 1-8 (2021) (Year: 2021).*
J. Burdon et al., Chemical Communications, 49-50 (1996) (Year: 1996).*
J. Burton et al., 50 Tetrahedron, 2993-3063 (1994) (Year: 1994).*
J. Normant, 400 Journal of Organometallic Chemistry, 19-34 (1990) (Year: 1990).*
J. Gillet et al., 26 Tetrahedron Letters, 3999-4002 (1985) (Year: 1985).*
A. Raghavanpillai et al., 69 Journal of Organic Chemistry, 7083-7091 (2004) (Year: 2004).*
International Search Report issued Feb. 9, 2021 in International (PCT) Application No. PCT/JP2020/047128.
Oppolzer et al., "Enantioselective Addition of (Z)- and (E)-Alkenylzinc Bromides to Aldehydes: Asymmetric Synthesis of SEC-Allylalcohols", Tetrahedron Letters, 1991, vol. 32, No. 41, pp. 5777-5780.

(Continued)

*Primary Examiner* — Alexander R Pagano
(74) *Attorney, Agent, or Firm* — Wenderoth, Lind & Ponack, L.L.P.

(57) ABSTRACT

According to the present invention, a fluorine-containing (cyclo)alkenyl zinc halide compound can be obtained in a high yield by reacting a halogenated olefin compound represented by formula (2):

(2)

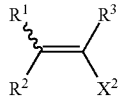

wherein $R^1$, $R^2$, and $R^3$ are as defined above, $X^2$ represents a halogen atom, and a single bond expressed with a wavy line indicates that the steric configuration with respect to a double bond to which the single bond is connected is E configuration, Z configuration, or a mixture of E configuration and Z configuration in any ratio, with a zinc halide compound represented by formula (3): $ZnX^1$ (3), wherein $X^1$ is as defined above, in the presence of a zerovalent alkali metal.

15 Claims, No Drawings

(56) References Cited

OTHER PUBLICATIONS

English language translation of International Preliminary Report on Patentability issued Jun. 28, 2022 in corresponding International (PCT) Patent Application No. PCT/JP2020/047128.

Introduction to Fluorine Chemistry 2010, with particial translation, pp. 309-311.

* cited by examiner

METHOD FOR PRODUCING FLUORINE-CONTAINING (CYCLO)ALKENYL ZINC HALIDE COMPOUND

TECHNICAL FIELD

The present disclosure relates to a method for producing a fluorine-containing (cyclo)alkenyl zinc halide compound.

BACKGROUND ART

Fluorine compounds having a fluorine-containing halogenated (cyclo)alkenyl group are useful as raw material monomers for fluorine-containing polymers for use in a variety of applications, such as ion-exchange membranes for fuel cells, sealing materials or fuel hoses for automobiles, aircraft, etc., optical fibers and other optical electronic components, and coating materials for paints, antifouling, etc. Fluorine compounds having a fluorine-containing halogenated (cyclo)alkenyl group are also useful as agricultural chemicals with enzyme inhibitory activity.

In particular, fluorine-containing (cyclo)alkenyl zinc halide compounds, such as trifluorovinyl zinc halide ((1,1,2-trifluoroethenyl) zinc halide), are known to be usable in the synthetic reaction for such a fluorine compounds having trifluorovinyl group (see, for example, Patent-literature (PTL) 1). Therefore, methods for obtaining a fluorine-containing (cyclo)alkenyl zinc halide compound in a high yield are increasingly studied.

For example, PTL 1 discloses a method for reacting a fluorine-containing olefin, such as tetrafluoroethylene or chlorotrifluoroethylene, with a zinc halide in the presence of magnesium or an alloy thereof.

On the other hand, fluorine-containing alkenes other than trifluorovinyl compounds are also expected to have various functions, as in trifluorovinyl compounds. However, the options for raw materials and synthetic methods for such fluorine-containing alkenes are even more limited than those for trifluorovinyl compounds; thus, so far almost no study has been done on the synthetic methods for them.

CITATION LIST

Patent Literature

PTL 1: WO 2013/172337

SUMMARY

Item 1. A method for producing a fluorine-containing (cyclo) alkenyl zinc halide compound represented by formula (1):

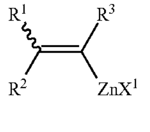

(1)

wherein $X^1$ represents a halogen atom, $R^1$ represents a fluorine atom or a monovalent perfluorohydrocarbon group, $R^2$ and $R^3$ are the same or different, and each represents a hydrogen atom or fluorine atom, or $R^3$ and $R^1$ or $R^2$ taken together optionally form a divalent perfluorohydrocarbon chain, and a single bond expressed with a wavy line indicates that the steric configuration with respect to a double bond to which the single bond is connected is E configuration, Z configuration, or a mixture of E configuration and Z configuration in any ratio, the method comprising (1) reacting a halogenated olefin compound represented by formula (2):

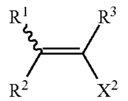

(2)

wherein $R^1$, $R^2$, and $R^3$ are as defined above, $X^2$ represents a halogen atom, and a single bond expressed with a wavy line indicates that the steric configuration with respect to a double bond to which the single bond is connected is E configuration, Z configuration, or a mixture of E configuration and Z configuration in any ratio, with a zinc halide compound represented by formula (3):

$ZnX^1$ (3), wherein $X^1$ is as defined above, in the presence of a zerovalent alkali metal.

Advantageous Effects of Invention

According to the present disclosure, a fluorine-containing (cyclo)alkenyl zinc halide compound can be obtained in a high yield.

DESCRIPTION OF EMBODIMENTS

In the present specification, the terms "comprise," "contain," and "include" encompass the concepts of comprising, consisting essentially of, and consisting of. In the present specification, a numerical range indicated by "A to B" means A or more, and B or less.

In the present disclosure, "yield" refers to the ratio (mol %) of the total molar amount of the target compound contained in the gas flowing out of the outlet of a reactor to the molar amount of the raw material compound supplied to the reactor.

In the present disclosure, the term "zerovalent alkali metal" is intended to mean a simple substance of alkali metal and does not include a compound containing an alkali metal. The same applies to, for example, "lithium metal," "sodium metal," and "potassium metal."

In the present disclosure, "olefin" includes both acyclic and cyclic olefins.

In the present disclosure, the team "(cyclo)alkenyl" means alkenyl and/or cycloalkenyl.

1. Method for Producing Fluorine-Containing (Cyclo)alkenyl Zinc Halide Compound The production method according to the present disclosure is a method for producing a fluorine-containing (cyclo) alkenyl zinc halide compound represented by formula (1):

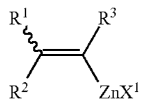

(1)

wherein $X^1$ represents a halogen atom, $R^1$ represents a fluorine atom or a monovalent perfluorohydrocarbon group, $R^2$ and $R^3$ are the same or different, and each represents a hydrogen atom or fluorine atom, or $R^3$ and $R^1$ or $R^2$ taken together optionally form a divalent perfluorohydrocarbon chain, and a single bond expressed with a wavy line indicates that the steric configuration with respect to a double bond to which the single bond is connected is E configuration, Z configuration, or a mixture of E configuration and Z configuration in any ratio, the method comprising (1) reacting a halogenated olefin compound represented by formula (2):

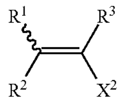

(2)

wherein $R^1$, $R^2$, and $R^3$ are as defined above, $X^2$ represents a halogen atom, and a single bond expressed with a wavy line indicates that the steric configuration with respect to a double bond to which the single bond is connected is E configuration, Z configuration, or a mixture of E configuration and Z configuration in any ratio, with a zinc halide compound represented by formula (3):

$ZnX^1$ (3), wherein $X^1$ is as defined above, in the presence of a zerovalent alkali metal.

According to the present disclosure, a fluorine-containing (cyclo)alkenyl zinc halide compound can be obtained in a yield higher than in PTL 1, in which the reaction is carried out in the presence of magnesium or an alloy thereof. Therefore, according to the present disclosure, a fluorine-containing (cyclo)alkenyl zinc halide compound can be obtained in a high yield.

(1-1) Halogenated Olefin Compound

The raw material compound for use in the production method according to the present disclosure is a halogenated olefin compound represented by formula (2):

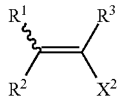

(2)

wherein $R^1$ represents a fluorine atom or a monovalent perfluorohydrocarbon group, $R^2$ and $R^3$ are the same or different, and each represents a hydrogen atom or fluorine atom, or $R^3$ and $R^1$ or $R^2$ taken together optionally form a divalent perfluorohydrocarbon chain, $X^2$ represents a halogen atom, and a single bond expressed with a wavy line indicates that the steric configuration with respect to a double bond to which the single bond is connected is E configuration, Z configuration, or a mixture of E configuration and Z configuration in any ratio.

In the present specification, a single bond expressed with a wavy line indicates that the steric configuration with respect to a double bond to which the single bond is connected is E configuration, Z configuration, or a mixture of E configuration and Z configuration in any ratio. That is, the halogenated olefin compounds represented by formula (2) encompass both of the halogenated olefin compounds represented by formulas (2A) and (2B):

(2A)

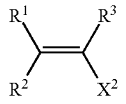

(2B)

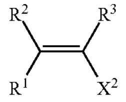

wherein $R^1$, $R^2$, $R^3$, and $X^2$ are as defined above.

That is, the raw material compounds encompass all of the halogenated olefin compounds represented by formulas (2-1), (2-2), (2-3), and (2-4):

(2-1)

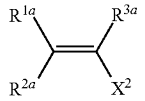

(2-2)

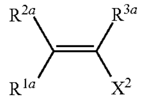

(2-3)

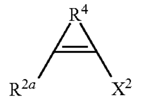

(2-4)

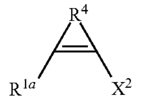

wherein $X^2$ is as defined above, $R^{1a}$ represents a fluorine atom or a perfluorohydrocarbon group, $R^{2a}$ and $R^{3a}$ are the same or different, and each represents a hydrogen atom or a fluorine atom, and $R^4$ represents a divalent perfluorohydrocarbon chain.

The fluorine-containing olefin compound represented by formula (2-3) is a fluorine-containing olefin compound of formula (2) in which $R^1$ and $R^3$ taken together form a divalent perfluorohydrocarbon chain.

Further, the fluorine-containing olefin represented by formula (2-4) is a fluorine-containing olefin compound of formula (2) in which $R^2$ and $R^3$ taken together form a divalent perfluorohydrocarbon chain.

Examples of the divalent perfluorohydrocarbon chain include perfluoroalkylene groups. The prefix "perfluoro" is used as having the typical meaning, and means that hydrogen atoms bonded to carbon atoms are all replaced with a fluorine atom. When a perfluoroalkylene group is used, $R^4$ in formulas (2-3) and (2-4) is preferably, for example, $-(CF_2)_n-$ (n is an integer of 1 to 5).

From the standpoint of obtaining a fluorine-containing (cyclo)alkenyl zinc halide compound more inexpensively, more easily, and in a higher yield, it is preferable that $R^3$ and $R^1$ or $R^2$ taken together do not form a divalent perfluorohydrocarbon chain. That is, halogenated olefin compounds represented by formulas (2-1) and (2-2) are preferred.

Examples of the monovalent perfluorohydrocarbon group represented by $R^1$ in formula (2) etc. include perfluoroalkyl groups, perfluoroalkenyl groups, and perfluoroalkynyl groups.

The prefix "perfluoro" in "perfluorohydrocarbon group" is used as having the typical meaning, and means that hydrogen atoms bonded to carbon atoms are all replaced with a fluorine atom.

Therefore, examples of perfluoroalkyl groups as a perfluorohydrocarbon group include groups in which the hydrogen atoms bonded to the carbon atoms in alkyl groups, in particular, lower (e.g., $C_1$-$C_6$) alkyl groups, are all replaced with a fluorine atom. Examples of alkyl groups here include methyl, ethyl, n-propyl, isopropyl, n-butyl, isobutyl, sec-butyl, tert-butyl, n-pentyl, isopentyl, neopentyl, 1-methylpentyl, n-hexyl, isohexyl, 1,1-dimethylbutyl, 2,2-dimethylbutyl, and 3,3-dimethylbutyl.

Further, examples of perfluoroalkenyl groups as a perfluorohydrocarbon group include groups in which the hydrogen atoms bonded to the carbon atoms in alkenyl groups, in particular, lower (e.g., $C_2$-$C_6$) alkenyl groups, are all replaced with a fluorine atom. Examples of alkenyl groups here include vinyl, 1-propenyl, isopropenyl, 2-methyl-1-propenyl, 1-butenyl, 2-butenyl, 3-butenyl, 2-ethyl-1-butenyl, 1-pentenyl, 2-pentenyl, 3-pentenyl, 4-pentenyl, 4-methyl-3-pentenyl, 1-hexenyl, 2-hexenyl, 3-hexenyl, 4-hexenyl, and 5-hexenyl.

Further, examples of perfluoroalkynyl groups as a perfluorohydrocarbon group include groups in which the hydrogen atoms bonded to the carbon atoms in alkynyl groups, in particular, lower (e.g., $C_2$-$C_6$) alkynyl groups, are all replaced with a fluorine atom. Examples of alkynyl groups here include ethynyl, 1-propynyl, 2-propynyl, 1-butynyl, 2-butynyl, 3-butynyl, 1-pentynyl, 2-pentynyl, 3-pentynyl, 4-pentynyl, 1-hexynyl, 2-hexynyl, 3-hexynyl, 4-hexynyl, and 5-hexynyl.

Of these, $R^1$ is preferably a fluorine atom, a perfluoroalkyl group, and a perfluoroalkenyl group, and more preferably a fluorine atom, from the standpoint of obtaining a fluorine-containing (cyclo)alkenyl zinc halide compound more inexpensively, more easily, and in a higher yield.

Further, $R^2$ and $R^3$ preferably each represent a fluorine atom from the standpoint of obtaining a fluorine-containing (cyclo)alkenyl zinc halide compound more inexpensively, more easily, and in a higher yield.

$X^2$ represents a halogen atom, such as a fluorine atom, a chlorine atom, a bromine atom, and an iodine atom. Of these, a fluorine atom, a chlorine atom, and a bromine atom are preferred, and a fluorine atom and a chlorine atoms are more preferred, from the standpoint of obtaining a fluorine-containing (cyclo)alkenyl zinc halide compound more inexpensively, more easily, and in a higher yield.

The halogenated olefin compounds described above are known compounds and can be produced by known methods or are commercially available. The halogenated olefin compounds may be used alone or in a combination of two or more. These halogenated olefin compounds may be added to a reactor according to a method appropriate to its form.

As the raw material compound of the fluorine-containing (cyclo)alkenyl zinc halide compound, it is particularly preferable to use fluorine-containing olefins, such as tetrafluoroethylene (TFE) and chlorotrifluoroethylene (CTFE), which are general-purpose monomers for fluororesins, from the viewpoint of raw material availability. The carbon-fluorine bond and carbon-chlorine bond are inert, compared with other carbon-halogen bonds; there have been very few cases in which these bonds could be replaced with other groups, and there are very few examples of synthesis of a fluorine-containing (cyclo)alkenyl zinc halide compound using TFE or CTFE as the raw material. There are also very few methods for easily synthesizing a fluorine-containing (cyclo)alkenyl zinc halide compound from perfluoroalkenes, such as hexafluoropropene. From this standpoint as well, $X^2$ particularly preferably represents a fluorine atom or a chlorine atom.

Accordingly, the raw material compound is particularly preferably tetrafluoroethylene (TFE), chlorotrifluoroethylene (CTFE), etc., and in this case, a trifluorovinyl zinc halide compound can be obtained as the target compound.

(1-2) Zinc Halide Compound

In the present disclosure, the halogenated olefin compound described above is reacted with a zinc halide compound.

The zinc halide compound is represented by formula (3):

$$ZnX^1 \quad (3),$$

wherein $X^1$ is as defined above.

Examples of the halogen atom represented by $X^1$ in formula (3) include, but are not limited to, a fluorine atom, a chlorine atom, a bromine atom, and an iodine atom. Of these, a chlorine atom and a bromine atom are preferred, and a chlorine atom is more preferred, from the standpoint of obtaining a fluorine-containing (cyclo)alkenyl zinc halide compound more inexpensively, more easily, and in a higher yield.

These zinc halide compounds may be used alone or in a combination of two or more.

In the present disclosure, the amount of the zinc halide compound for use is not limited. It is preferable to adjust the molar ratio of the halogenated olefin compound to the zinc halide compound (halogenated olefin compound/zinc halide compound) to be 0.01 to 100, particularly 0.1 to 10, and further particularly 1 to 5, from the standpoint of obtaining a fluorine-containing (cyclo)alkenyl zinc halide compound more inexpensively, more easily, and in a higher yield.

In the present disclosure, the amount of the zinc halide compound for use is not limited. The molar ratio of the zinc halide compound to a zerovalent alkali metal (zinc halide compound/zerovalent alkali metal) is preferably 0.1 to 5, and more preferably 0.5 to 2, from the standpoint of obtaining a fluorine-containing (cyclo)alkenyl zinc halide compound more inexpensively, more easily, and in a higher yield.

(1-3) Zerovalent Alkali Metal

In the present disclosure, step (1) described above is performed in the presence of a zerovalent alkali metal.

Examples of the zerovalent alkali metal include, but are not limited to, lithium metal, sodium metal, and potassium metal. Of these, sodium metal and potassium metal are preferred, and sodium metal is more preferred, from the standpoint of obtaining a fluorine-containing (cyclo)alkenyl zinc halide compound more inexpensively, more easily, and in a higher yield. These zerovalent alkali metals may be used alone or in a combination of two or more.

In the present disclosure, a zerovalent alkali metal may be used as is as the zerovalent alkali metal. However, in view of safety, it is preferable to use a zerovalent alkali metal dispersion in which the zerovalent alkali metal (specifically, zerovalent alkali metal particles) is dispersed in a dispersion oil.

In the dispersion oil of the zerovalent alkali metal dispersion, an aromatic component is preferably present in an amount of 3 to 20 mass % based on the dispersion oil defined as 100 mass %.

For the dispersion oil, typically, a commercially available mineral oil that contains an aromatic component in the above proportion can be suitably selected for use.

It is also possible to mix two or more oils each having a different proportion of an aromatic component so that the total content of the aromatic component is 3 to 20 mass %.

To improve the dispersibility of the zerovalent alkali metal, the dispersion oil preferably contains oleic acid, sorbitan trioleate, linseed oil, etc. The content is preferably 0.005 mass % or more, and more preferably 0.05 to 0.5 mass %.

If necessary, the dispersion oil may contain two or more members selected from oleic acid, sorbitan trioleate, and linseed oil. In this case as well, the total content is preferably 0.005 to 0.5% mass %.

The content of the aromatic component in the dispersion oil is preferably 5 to 15 mass %, and more preferably 10 to 15 mass %, from the standpoint of obtaining a fluorine-containing (cyclo)alkenyl zinc halide compound more inexpensively, more easily, and in a higher yield.

The content of the aromatic component is measured in accordance with ASTM D3238.

The ratio of the dispersion oil and the zerovalent alkali metal particles in the zerovalent alkali metal dispersion is not limited, and can be suitably selected according to the application etc. In particular, the zerovalent alkali metal particles are preferably present in an amount of 1 to 50 mass %, and more preferably 10 to 25 mass %, based on the total amount of the zerovalent alkali metal dispersion defined as 100 mass %, from the standpoint of obtaining a fluorine-containing (cyclo)alkenyl zinc halide compound more inexpensively, more easily, and in a higher yield.

The zerovalent alkali metal particles for use typically have an average particle size of 10 μm or less. From the standpoint of obtaining a fluorine-containing (cyclo)alkenyl zinc halide compound more inexpensively, more easily, and in a higher yield, the zerovalent alkali metal particles for use preferably have an average particle size of 0.01 to 5 μm. The average particle size of the zerovalent alkali metal particles is measured by microscopic observation.

Known or commercially available zerovalent alkali metal dispersions can be used. The zerovalent alkali metal dispersion can be also produced according to the method described in JP2009-102678A.

In the present disclosure, the amount of the zerovalent alkali metal for use is not limited. From the standpoint of obtaining a fluorine-containing (cyclo)alkenyl zinc halide compound more inexpensively, more easily, and in a higher yield, the molar ratio of the halogenated olefin compound to the zerovalent alkali metal (halogenated olefin compound/zerovalent alkali metal) is preferably adjusted to be 0.01 to 100, particularly 0.5 to 20, and further particularly 3 to 7. When the zerovalent alkali metal dispersion is used, it is preferable to adjust the amount of the zerovalent alkali metal present in the zerovalent alkali metal dispersion to be in the above range.

(1-4) Solvent

In step (1) above, the reaction is preferably a liquid phase reaction in the presence of a solvent, from the standpoint of obtaining a fluorine-containing (cyclo)alkenyl zinc halide compound more inexpensively, more easily, and in a higher yield.

When the zerovalent alkali metal is used in the form of the zerovalent alkali metal dispersion, it is possible to use an additional solvent or not use an additional solvent. When the zerovalent alkali metal is not used in the form of the zerovalent alkali metal dispersion, use of an additional solvent is preferred.

There is no limitation to such a solvent. In view of safety in handling a zerovalent alkali metal and obtaining a fluorine-containing (cyclo)alkenyl zinc halide compound more inexpensively, more easily, and in a higher yield, use of an aprotic polar solvent is preferred.

Examples of the aprotic polar solvent include lactam compounds, such as N-methylpyrrolidone; dialkyl sulfoxide compounds, such as dimethyl sulfoxide (DMSO); tetraalkyl urea compounds, such as 1,3-dimethyl-2-imidazolidinone (DMI), dimethylpropyleneurea (DMU), and tetramethylurea (TMU); and hexaalkyl phosphoric triamide compounds, such as hexamethylphosphoramide (HMPA). Of these, tetraalkyl urea compounds are preferred, and 1,3-dimethyl-2-imidazolidinone (DMI) is more preferred in view of safety in handling a zerovalent alkali metal and obtaining a fluorine-containing (cyclo)alkenyl zinc halide compound more inexpensively, more easily, and in a higher yield. These solvents may be used alone or in a combination of two or more.

The amount of the solvent for use is not limited and may be an excess amount.

(1-5) Reaction Temperature

In step (1) according to the present disclosure, typically, the reaction temperature is preferably 0 to 100° C., more preferably 10 to 70° C., and even more preferably 20 to 60° C., from the standpoint of obtaining a fluorine-containing (cyclo)alkenyl zinc halide compound more inexpensively, more easily, and in a higher yield. Specifically, step (1) can proceed even under mild conditions.

(1-6) Reaction Time

In step (1) according to the present disclosure, the reaction time may be adjusted so that the reaction sufficiently proceeds; i.e., the reaction can proceed until no pressure fluctuation is observed after the lid of the vessel is closed. The reaction time is typically 6 to 48 hours, and particularly 12 to 36 hours.

(1-7) Reaction Pressure

In step (1) according to the present disclosure, the reaction pressure is not limited. In the beginning of the reaction, it is preferable to introduce the halogenated olefin compound as the raw material compound so that the pressure is preferably −0.95 to 10 MPa, and more preferably 0 to 5 MPa. In the present disclosure, the pressure is referred to as "gauge pressure" unless otherwise specified.

In the reaction in step (1) according to the present disclosure, the reactor may be in any shape and of any structure as long as it is capable of withstanding the above temperature and pressure. Examples of the reactor include vertical reactors, horizontal reactors, and multi-tube reactors. Examples of the material for the reactor include glass, stainless steel, iron, nickel, and iron-nickel alloys.

(1-8) Examples of Reactions

Step (1) can be performed by a liquid-phase reaction (batch reaction) by introducing the raw material compound (halogenated olefin compound), a zinc halide compound, and a zerovalent alkali metal into a reactor.

After the completion of the reaction, purification is optionally performed according to usual methods, whereby a fluorine-containing (cyclo)alkenyl zinc halide compound can be obtained.

(1-9) Step (2)

In the present disclosure, a fluorine-containing (cyclo) alkenyl zinc halide compound can be obtained both in the form of a liquid phase and a gas phase by performing step (1) described above. Of these, the form of a liquid phase is preferred when the obtained fluorine-containing (cyclo)alkenyl zinc halide compound is subjected to a dimerization reaction as described below. Specifically, when the zerovalent alkali metal dispersion is used as the zerovalent alkali metal, or when a liquid-phase reaction is performed using the solvents mentioned above, a liquid phase containing the fluorine-containing (cyclo)alkenyl zinc halide compound can be obtained as a product.

In this case, it is preferable to perform step (2) of mixing a liquid phase containing the fluorine-containing (cyclo) alkenyl zinc halide compound obtained in step (1) with a poor solvent solution for metal halides to separate the liquid phase containing the fluorine-containing (cyclo)alkenyl zinc halide compound from solids containing the metal halides.

Step (2) can be performed according to usual methods, specifically, according to JP2016-128415A.

By performing step (2), impurities, in particular, metal halides, can be removed from the fluorine-containing (cyclo) alkenyl zinc halide compound. The metal source of the metal halides can be mainly the zerovalent alkali metal and zinc contained in the reaction system of step (1). The halogen source can be mainly halogen ($X^2$) in the halogenated olefin compound represented by formula (2), and halogen ($X^1$) in the zinc halide compound represented by formula (3). That is, the metal halides as impurities can be byproducts of the reaction in step (1).

Specifically, for example, when the zerovalent alkali metal source is sodium, and the halogen source is chlorine, it is possible to remove sodium chloride, zinc chloride, etc. as impurities in step (2). As a result, the concentration of metal halides can be, but is not limited to, 10 mol % or less.

There is no limitation to poor solvents that can be used in step (2). It is preferable to use a poor solvent that allows for deposition of metal halides from the solvents used in step (1) (e.g., the solvent used for the zerovalent alkali metal dispersion and the aprotic polar solvent used as the reaction solvent in step (1)). Although not so limited, the poor solvent for use preferably has a relative permittivity lower than that of the solvents used in step (1). The poor solvent preferably has a relative permittivity at room temperature of 40 or less, more preferably 20 or less, and even more preferably 10 or less.

Examples of the poor solvents include, but are not limited to, ether compounds, aromatic hydrocarbon compounds, ketone compounds, and ester compounds. Examples of ethers include, but are not limited to, dimethyl ether, diethyl ether, dinormal propyl ether, diisopropyl ether, dibutyl ether, diphenyl ether, tert-butyl methyl ether, cyclopentyl methyl ether, dimethoxyethane, diethoxyethane, and anisole. Examples of aromatic hydrocarbons include, but are not limited to, benzene, toluene, xylene, and mesitylene. Of these, ethers are preferred.

Although not so limited, for the poor solvent, a smaller partition coefficient of the aprotic polar solvent is more preferred. The partition coefficient of the aprotic polar solvent is determined based on the equilibrium solubility ratio measured when the aprotic polar solvent is dissolved in two phases of water and a solvent. More specifically, it is calculated according to the following equation:

Partition coefficient of aprotic polar solvent=the concentration of the aprotic polar solvent in the solvent layer/the concentration of the aprotic polar solvent in the water layer For the poor solvents, the partition coefficient of the aprotic polar solvent is preferably 3 or less, more preferably 1 or less, and even more preferably 0.2 or less.

The poor solvents may be used alone or in a combination of two or more. It is also possible to combine the poor solvent with other solvents. In this case, the solvents can be combined within the range that allows for deposition of metal halides. Although not so limited, for example, the solvents can be combined so that the poor solvent is present in an amount of 50 mass % or more based on the total amount of the solvents as long as the combined solvents can allow for deposition of metal halides.

The amount of the poor solvent solution for metal halides used in step (2) is not limited. Typically, the amount can be about the same as the amount of the liquid phase containing the fluorine-containing (cyclo)alkenyl zinc halide compound. The amount is not limited and may be, for example, 0.1 to 50 times, preferably 0.5 to 10 times, and more preferably 1 to 3 times that of the liquid phase on a volume ratio basis.

The conditions for mixing the liquid phase containing the fluorine-containing (cyclo)alkenyl zinc halide compound and the poor solvent solution for metal halides are not limited. For example, the mixing may be performed by stirring at room temperature for about 1 minute to 72 hours, preferably about 5 minutes to 24 hours, and more preferably about 10 minutes to 12 hours.

Although not so limited, filtration may be optionally performed to remove impurities before and/or after (in particular, after) performing the separation using the poor solvent solution for metal halides. Examples of filtration methods include, but are not limited to, Celite filtration, decantation, filtration, pressure filtration, and centrifugal filtration. In this case, although not so limited, it is preferable to remove 40% or more, more preferably 60% or more, and even more preferably 70% or more of the total mass of the added metals and metal halides.

(1-10) Target Compound

The thus-obtained fluorine-containing (cyclo)alkenyl zinc halide compound is a fluorine-containing (cyclo)alkenyl zinc halide compound represented by formula (1):

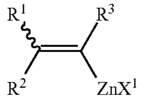
(1)

wherein $X^1$, $R^1$, $R^2$, and $R^3$ are as defined above, and a single bond expressed with a wavy line indicates that the steric configuration with respect to a double bond to which the single bond is connected is E configuration, Z configuration, or a mixture of E configuration and Z configuration in any ratio.

Like formula (2) above, the fluorine-containing (cyclo) alkenyl zinc halide compound also encompasses both of the fluorine-containing (cyclo)alkenyl zinc halide compounds represented by formulas (1A) and (1B):

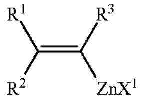
(1A)

-continued (1B)

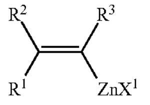

wherein $R^1$, $R^2$, $R^3$, and $X^1$ are as defined above.

More specifically, the obtained target compound encompasses all of the fluorine-containing (cyclo)alkenyl zinc halide compounds represented by formulas (1-1), (1-2), (1-3), and (1-4):

(1-1)

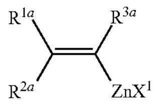

(1-2)

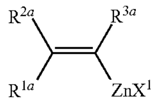

(1-3)

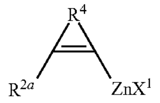

(1-4)

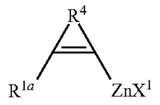

wherein $X^1$, $R^{1a}$, $R^{2a}$, $R^{3a}$, and $R^4$ are as defined above.

The fluorine-containing olefin compound represented by formula (1-3) is a fluorine-containing (cyclo)alkenyl zinc halide compound of formula (1) in which $R^2$ and $R^3$ taken together form a divalent perfluorohydrocarbon chain.

Further, the fluorine-containing olefin represented by formula (1-4) is a fluorine-containing (cyclo)alkenyl zinc halide compound of formula (1) in which $R^2$ and $R^3$ taken together form a divalent perfluorohydrocarbon chain.

It is preferable that $R^3$ and $R^1$ or $R^2$ taken together do not form a divalent perfluorohydrocarbon chain, from the standpoint of obtaining a fluorine-containing (cyclo)alkenyl zinc halide compound more inexpensively, more easily, and in a higher yield. That is, the fluorine-containing (cyclo)alkenyl zinc halide compounds represented by formulas (1-1) and (1-2) are preferred.

As stated above, the halogenated olefin compound, which is the raw material compound, is particularly preferably tetrafluoroethylene (TFE), chlorotrifluoroethylene (CTFE), etc. In this case, the obtained target compound can be a halogenated trifluorovinyl zinc compound represented by formula (1) in which $R^1$, $R^2$, and $R^3$ each represent a fluorine atom.

The fluorine-containing (cyclo)alkenyl zinc halide compound described above is useful as a raw material monomer for fluorine-containing polymers used in a variety of applications, such as ion-exchange membranes for fuel cells, sealing materials or fuel hoses for automobiles, aircraft, etc., optical fibers and other optical electronic components, and coating materials for paints, antifouling, etc. The fluorine-containing (cyclo)alkenyl zinc halide compound is also useful as an intermediate for synthesizing fluorine compounds useful as agricultural chemicals with enzyme inhibitory activity.

2. Method for Producing Fluorine-Containing Halogenated (Cyclo)alkenyl Dimer

The method for producing a fluorine-containing halogenated (cyclo)alkenyl dimer according to the present disclosure is a method for producing a fluorine-containing halogenated (cyclo)alkenyl dimer represented by formula (4):

(4)

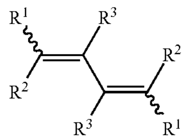

wherein $R^1$, $R^2$, and $R^3$ are as defined above, two $R^1$s are the same, two $R^2$s are the same, two $R^3$s are the same, a single bond expressed with a wavy line indicates that the steric configuration with respect to a double bond to which the single bond is connected is E configuration, Z configuration, or a mixture of E configuration and Z configuration in any ratio, the method comprising (3) dimerizing the fluorine-containing (cyclo)alkenyl zinc halide compound obtained by the production method described above.

In step (1) above, if a liquid phase containing the fluorine-containing (cyclo)alkenyl zinc halide compound is obtained, the step is preferably performed for reacting the liquid phase. If the purity of the fluorine-containing (cyclo)alkenyl zinc halide compound obtained in step (1) is high enough, step (3) may be performed without performing step (2), or step (3) may be performed after performing step (2).

Step (3) can be performed according to usual methods, specifically, according to JP2016-128415A.

In step (3), specifically, for example, the target coupling product, i.e., a fluorine-containing halogenated (cyclo)alkenyl dimer, can be obtained by stirring the liquid phase obtained in step (1) or step (2) under moderate temperature conditions.

The reaction in step (3) may be a coupling reaction based on addition-elimination reaction. In this case, the reaction may be performed in the presence of a copper salt or iron salt so as to promote the coupling reaction. This increases the efficiency of the reaction and improves the yield, and is also advantageous from a cost perspective since the use of expensive catalysts, such as palladium catalysts, is not required.

Since the copper salt or iron salt is used for a coupling reaction based on addition-elimination reaction, it is preferable to perform the reaction under conditions in which these metal salts are present in an amount equal to or more than the total equivalents of the equivalents of the fluorine-containing (cyclo)alkenyl zinc halide compound and twice the equivalents of the zinc halide compound. The amount of the copper salt or iron salt for use is not limited and may be typically about 0.5 to 3 mol, and preferably about 1 to 2 mol, based on the total number of moles of the number of moles of the fluorine-containing (cyclo)alkenyl zinc halide compound and twice the number of moles of the zinc halide compound.

The copper salt or iron salt for use is preferably easily dissolved in the reaction solution. The copper salt or iron salt can be selected as appropriate according to the reaction solution.

Examples of copper and iron salts include, but are not limited to, trivalent iron compounds and divalent copper compounds. In particular, copper salts are preferred.

Metal complexes (metal complex salts) can also be used as the copper salt or iron salt. Examples include halogen salts, acetic acid salts, and acetylacetone complexes. Of these, halogen salts, acetic acid salts, acetylacetone complexes, etc. are preferred as the metal salt, in tams of yield. For halogen salts, bromine salt or chlorine salt are preferred, and chlorine salt is particularly preferred.

The reaction in step (3) is not limited. The reaction may also be performed in the presence of various catalysts. Examples of catalysts include, but are not limited to, transition metal complex catalysts.

The use of a transition metal complex catalyst causes an oxidative addition reaction, a metal exchange reaction, and a reductive elimination reaction successively, whereby the target compound can be obtained. Examples of transition metals include, but are not limited to, nickel, palladium, platinum, ruthenium, rhodium, and cobalt. The transition metal is particularly preferably palladium or nickel.

Examples of transition metal complex catalysts include, but are not limited to, zerovalent transition metal complexes, zerovalent transition metal complexes generated from divalent transition metal complexes during a reaction, and complexes obtainable by mixing these complexes with at least one compound (compounder) selected from the group consisting of ketones, diketones, phosphines, diamines, and bipyridyls.

In the reaction in step (3), the reaction temperature is typically −20 to 120° C., preferably 0 to 120° C., more preferably 20 to 80° C., and still more preferably 20 to 60° C. When the reaction is performed at a temperature equal to or higher than room temperature, the lower limits in the above ranges can be further adjusted to, for example, 40° C., 60° C., or 80° C.

In the reaction in step (3), the reaction time is typically 0.5 minutes to 24 hours, and preferably 5 minutes to 6 hours.

The reaction in step (3) can be preferably performed in an inert gas atmosphere, such as argon or nitrogen.

When the fluorine-containing halogenated (cyclo)alkenyl dimer is synthesized in step (3), the content of zinc halide compounds as an impurity can be reduced to 5000 ppm or less.

The fluorine-containing halogenated (cyclo)alkenyl dimer obtained in step (3) can be isolated and purified by solvent extraction, chromatography, distillation, or other known purification methods, if desired.

The thus-obtained fluorine-containing halogenated (cyclo)alkenyl dimer is useful as a raw material monomer for fluorine-containing polymers used in a variety of applications, such as ion-exchange membranes for fuel cells, sealing materials or fuel hoses for automobiles, aircraft, etc., optical fibers and other optical electronic components, and coating materials for paints, antifouling, etc. The fluorine-containing halogenated (cyclo)alkenyl dimer is also useful as an agricultural chemical with enzyme inhibitory activity.

The embodiments of the present disclosure are described above; however, it will be understood that various changes in the foams and details can be made without departing from the spirit and scope of the claims.

The present disclosure encompasses the following embodiments.

Item 1. A method for producing a fluorine-containing (cyclo) alkenyl zinc halide compound represented by formula (1):

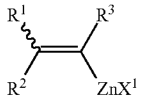

(1)

wherein
$X^1$ represents a halogen atom,
$R^1$ represents a fluorine atom or a monovalent perfluorohydrocarbon group,
$R^2$ and $R^3$ are the same or different, and each represents a hydrogen atom or fluorine atom, or $R^3$ and $R^1$ or $R^2$ taken together optionally form a divalent perfluorohydrocarbon chain, and a single bond expressed with a wavy line indicates that the steric configuration with respect to a double bond to which the single bond is connected is E configuration, Z configuration, or a mixture of E configuration and Z configuration in any ratio, the method comprising
(1) reacting
a halogenated olefin compound represented by formula (2):

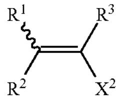

(2)

wherein
$R^1$, $R^2$, and $R^3$ are as defined above,
$X^2$ represents a halogen atom, and
a single bond expressed with a wavy line indicates that the steric configuration with respect to a double bond to which the single bond is connected is E configuration, Z configuration, or a mixture of E configuration and Z configuration in any ratio, with
a zinc halide compound represented by formula (3):

$$ZnX^1 \quad (3),$$

wherein $X^1$ is as defined above,
in the presence of a zerovalent alkali metal.

Item 2. The production method according to Item 1, wherein $X^2$ is a fluorine atom or a chlorine atom.

Item 3. The production method according to Item 1 or 2, wherein the fluorine-containing (cyclo)alkenyl zinc halide compound represented by formula (1) is a trifluorovinyl zinc halide compound, and the halogenated olefin compound represented by formula (2) is tetrafluoroethylene or chlorotrifluoroethylene.

Item 4. The production method according to any one of Items 1 to 3, wherein the zerovalent alkali metal is at least one member selected from the group consisting of lithium metal, sodium metal, and potassium metal.

Item 5. The production method according to any one of Items 1 to 4, wherein the zerovalent alkali metal is sodium metal.

Item 6. The production method according to any one of Items 1 to 5, wherein the zerovalent alkali metal is dispersed in a dispersion oil.

Item 7. The production method according to any one of Items 1 to 6, wherein step (1) is performed in an aprotic polar solvent.

Item 8. The production method according to any one of Items 1 to 7, wherein the aprotic polar solvent is at least one solvent selected from the group consisting of lactam compounds, dialkyl sulfoxide compounds, tetraalkyl urea compounds, and hexaalkyl phosphoric triamide compounds.

Item 9. The production method according to any one of Items 1 to 8, wherein the aprotic polar solvent is a tetraalkyl urea compound.

Item 10. The production method according to any one of Items 1 to 9, wherein, in step (1), the molar ratio of the zinc halide compound to the zerovalent alkali metal (zinc halide compound/zerovalent alkali metal) is 0.1 to 5.

Item 11. The production method according to any one of Items 1 to 10, wherein, in step (1), the molar ratio of the halogenated olefin compound to the zerovalent alkali metal (halogenated olefin compound/zerovalent alkali metal) is 0.01 to 100.

Item 12. The production method according to any one of Items 1 to 11, wherein, in step (1), the molar ratio of the halogenated olefin compound to the zinc halide compound (halogenated olefin compound/zinc halide compound) is 0.01 to 100.

Item 13. The production method according to any one of Items 1 to 12, wherein the reaction in step (1) is performed at a temperature of 0 to 100° C.

Item 14. The production method according to any one of Items 1 to 13, further comprising (2) mixing a liquid phase containing the fluorine-containing (cyclo)alkenyl zinc halide compound obtained in step (1) with a poor solvent solution for metal halides to separate the liquid phase containing the fluorine-containing (cyclo)alkenyl zinc halide compound from solids containing the metal halides.

Item 15. A method for producing a fluorine-containing halogenated (cyclo)alkenyl dimer represented by formula (4):

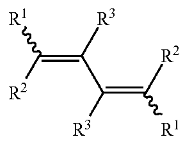

(4)

wherein $R^1$, $R^2$, and $R^3$ are as defined above, two $R^1$s are the same, two $R^2$s are the same, two $R^3$s are the same, and a single bond expressed with a wavy line indicates that the steric configuration with respect to a double bond to which the single bond is connected is E configuration, Z configuration, or a mixture of E configuration and Z configuration in any ratio, the method comprising (3) dimerizing the fluorine-containing (cyclo)alkenyl zinc halide compound obtained by the production method of any one of Items 1 to 14.

Item 16. The production method according to Item 15, wherein step (3) is a step of reacting a liquid phase containing the fluorine-containing (cyclo)alkenyl zinc halide compound.

Item 17. The production method according to Item 15 or 16, wherein step (3) is performed in the presence of a copper salt or iron salt.

EXAMPLES

The present disclosure is described in more detail below with reference to Examples. However, the present disclosure is not limited to the embodiments of these Examples.

Example 1

A sodium dispersion (a metal sodium dispersion, sodium content: 25 mass %, 2.0 mmol in terms of sodium equivalent) and zinc chloride (4.0 mmol) were placed in a 50-$cm^3$ glass autoclave reaction vessel. Further, 10 $cm^3$ of 1,3-dimethyl-2-imidazolidinone (DMI) was added to the reaction vessel, and the mixture was stirred at room temperature for 30 minutes. Subsequently, tetrafluoroethylene (TFE) was added to the reaction vessel so that the pressure was 0.5 MPa (10 mmol), and the mixture was stirred at 60° C. for 24 hours. The liquid phase in the reaction vessel was sampled and subjected to $^{19}$F-NMR analysis using an internal standard, which revealed that trifluorovinyl zinc chloride was produced in a yield of 70%. Table 1 shows the results.

Example 2

The reaction proceeded in the same manner as in Example 1, except that chlorotrifluoroethylene (CTFE) was used instead of tetrafluoroethylene (TFE) as the raw material compound. The liquid phase in the reaction vessel was sampled and subjected to $^{19}$F-NMR analysis using an internal standard, which revealed that trifluorovinyl zinc chloride was produced in a yield of 99%. Table 1 shows the results.

Example 3

The reaction was carried out in the same manner as in Example 1, except that the amount of zinc chloride used as the raw material compound was changed from 4.0 mmol to 1.0 mmol. The liquid phase in the reaction vessel was sampled and subjected to $^{19}$F-NMR analysis using an internal standard, which revealed that trifluorovinyl zinc chloride was produced in a yield of 99% or more. Table 1 shows the results.

Example 4

The reaction was carried out in the same manner as in Example 1, except that the amount of zinc chloride used as the raw material compound was changed from 4.0 mmol to 2.0 mmol. The liquid phase in the reaction vessel was sampled and subjected to $^{19}$F-NMR analysis using an internal standard, which revealed that trifluorovinyl zinc chloride was produced in a yield of 99% or more. Table 1 shows the results.

Comparative Example 1

The reaction proceeded in the same manner as in Example 1, except that a magnesium powder (2.0 mmol) was used instead of the sodium dispersion as the metal species. The liquid phase in the reaction vessel was sampled and subjected to $^{19}$F-NMR analysis using an internal standard, which revealed that trifluorovinyl zinc chloride was produced in a yield of 58%. Table 1 shows the results.

Comparative Example 2

The reaction proceeded in the same manner as in Example 1, except that a magnesium powder (2.0 mmol) was used instead of the sodium dispersion as the metal species, and that chlorotrifluoroethylene (CTFE) was used instead of tetrafluoroethylene (TFE) as the raw material compound. The liquid phase in the reaction vessel was sampled and subjected to $^{19}F$-NMR analysis using an internal standard, which revealed that trifluorovinyl zinc chloride was produced in a yield of 55%. Table 1 shows the results.

(2)

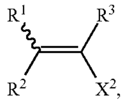

wherein $R^1$, $R^2$, and $R^3$ are as defined above, $X^2$ represents a fluorine atom, and

TABLE 1

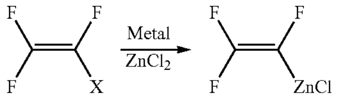

| | Ex. 1 | Ex. 2 | Ex. 3 | Ex. 4 | Comp. Ex. 1 | Comp. Ex. 2 |
|---|---|---|---|---|---|---|
| Substrate | | | | | | |
| Type | X = F | X = Cl | X = F | X = F | X = F | X = Cl |
| Amount (MPa) | 0.5 | 0.5 | 0.5 | 0.5 | 0.5 | 0.5 |
| Metal | | | | | | |
| Type | Na (dispersion) | Na (dispersion) | Na (dispersion) | Na (dispersion) | Mg | Mg |
| Amount (mmol) | 2.0 | 2.0 | 2.0 | 2.0 | 2.0 | 2.0 |
| Zinc chloride | | | | | | |
| Amount (mmol) | 4.0 | 4.0 | 1.0 | 2.0 | 4.0 | 4.0 |
| Yield | 70% | 99% | 99% or more | 99% or more | 58% | 55% |

The invention claimed is:

1. A method for producing a fluorine-containing (cyclo) alkenyl zinc halide compound represented by formula (1):

(1)

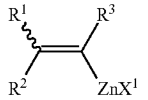

wherein $X^1$ represents a halogen atom, $R^1$ represents a fluorine atom or a monovalent perfluorohydrocarbon group, $R^2$ and $R^3$ are the same or different, and each represents a hydrogen atom or fluorine atom, or $R^3$ and $R^1$ or $R^2$ taken together optionally form a divalent perfluorohydrocarbon chain, and a single bond expressed with a wavy line indicates that the steric configuration with respect to a double bond to which the single bond is connected is E configuration, Z configuration, or a mixture of E configuration and Z configuration in any ratio, the method comprising a step (1) of reacting a halogenated olefin compound represented by formula (2):

a single bond expressed with a wavy line indicates that the steric configuration with respect to a double bond to which the single bond is connected is E configuration, Z configuration, or a mixture of E configuration and Z configuration in any ratio, with a zinc halide compound represented by formula (3):

$ZnX^1$ (3), wherein $X^1$ is as defined above, in the presence of a zerovalent alkali metal, wherein the zerovalent alkali metal is sodium metal and/or potassium metal.

2. The method according to claim 1, wherein the fluorine-containing (cyclo)alkenyl zinc halide compound represented by formula (1) is a trifluorovinyl zinc halide compound, and the halogenated olefin compound represented by formula (2) is tetrafluoroethylene or chlorotrifluoroethylene.

3. The method according to claim 1, wherein the zerovalent alkali metal is sodium metal.

4. The method according to claim 1, wherein the zerovalent alkali metal is dispersed in a dispersion oil.

5. The method according to claim 1, wherein step (1) is performed in an aprotic polar solvent.

6. The method according to claim 5, wherein the aprotic polar solvent is at least one solvent selected from the group consisting of lactam compounds, dialkyl sulfoxide compounds, tetraalkyl urea compounds, and hexaalkyl phosphoric triamide compounds.

7. The method according to claim 5, wherein the aprotic polar solvent is a tetraalkyl urea compound.

8. The method according to claim 1, wherein, in step (1), the molar ratio of the zinc halide compound to the zerovalent alkali metal (zinc halide compound/zerovalent alkali metal) is 0.1 to 5.

9. The method according to claim 1, wherein, in step (1), the molar ratio of the halogenated olefin compound to the zerovalent alkali metal (halogenated olefin compound/zerovalent alkali metal) is 0.01 to 100.

10. The method according to claim 1, wherein, in step (1), the molar ratio of the halogenated olefin compound to the zinc halide compound (halogenated olefin compound/zinc halide compound) is 0.01 to 100.

11. The method according to claim 1, wherein the reaction in step (1) is performed at a temperature of 0 to 100° C.

12. The method according to claim 1, further comprising (2) mixing a liquid phase containing the fluorine-containing (cyclo)alkenyl zinc halide compound obtained in step (1) with a poor solvent solution for metal halides to separate the liquid phase containing the fluorine-containing (cyclo)alkenyl zinc halide compound from solids containing the metal halides.

13. A method for producing a fluorine-containing halogenated (cyclo)alkenyl dimer represented by formula (4):

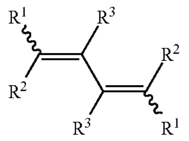

(4)

wherein $R^1$, $R^2$, and $R^3$ are as defined in claim 1, two $R^1$s are the same, two $R^2$s are the same, two $R^3$s are the same, and a single bond expressed with a wavy line indicates that the steric configuration with respect to a double bond to which the single bond is connected is E configuration, Z configuration, or a mixture of E configuration and Z configuration in any ratio, the method comprising producing the fluorine-containing (cyclo) alkenyl zinc halide compound represented by formula (1) according to the method of claim 1, and a further step (3) of dimerizing the fluorine-containing (cyclo) alkenyl zinc halide compound represented by formula (1) to obtain the fluorine-containing halogenated (cyclo) alkenyl dimer of formula (4).

14. The method according to claim 13, wherein the step (3) of dimerizing comprises reacting a liquid phase containing the fluorine-containing (cyclo) alkenyl zinc halide compound.

15. The method according to claim 13, wherein the step (3) of dimerizing comprises is performed in the presence of a copper salt or iron salt.

* * * * *